United States Patent [19]

Pretto

[11] Patent Number: 4,586,098
[45] Date of Patent: Apr. 29, 1986

[54] ADJUSTABLE MOUNTING ARRANGEMENT FOR MAGNETIC HEAD

[76] Inventor: John Pretto, 624 S. Belmont, Arlington Heights, Ill. 60005

[21] Appl. No.: 553,404

[22] Filed: Nov. 21, 1983

[51] Int. Cl.⁴ .................... G11B 5/48; G11B 5/56; G11B 21/24
[52] U.S. Cl. .................................. 360/109; 360/104
[58] Field of Search .............................. 360/104–105, 360/109

[56] References Cited

U.S. PATENT DOCUMENTS

| | | | |
|---|---|---|---|
| 3,767,209 | 10/1973 | Seehawer | 360/104 |
| 3,978,522 | 8/1976 | Rothlisberger | 360/104 |
| 4,121,836 | 10/1978 | Cheeseboro | 360/104 X |
| 4,328,521 | 5/1982 | Pexton et al. | 360/105 X |
| 4,375,071 | 2/1983 | Crowley | 360/109 |

Primary Examiner—John H. Wolff
Attorney, Agent, or Firm—Robert J. Black

[57] ABSTRACT

An adjustable mounting arrangement for mounting magnetic heads used for the recording and playback of information on magnetic tape. Vertical and azimuth adjustment utilizing a simple bracket facilitate optimization of head location.

11 Claims, 6 Drawing Figures

ADJUSTABLE MOUNTING ARRANGEMENT FOR MAGNETIC HEAD

BACKGROUND OF THE INVENTION

1. Field of the Invention

The present invention relates to magnetic recording and more particularly to a mounting arrangement for a magnetic head which provides for vertical adjustment and azimuth alignment of the face of the transducer head.

2. Background Art

In the field of recording and in particular the field of information recording utilizing magnetic tapes, it is the conventional practice to support transducer heads utilized for recording, playback and erase in a manner so that the tape engaging faces of the respective heads are disposed in substantially parallel relation to the plane of the magnetic tape. It is highly desirable that the vertical axes of the respective heads be disposed parallel to the tape and in planes normal to the longitudinal axis of the tape, such relationship being known as the azimuth alignment of the transducer heads relative to the tape. Such head-to-tape relationship is essential to insure proper engagement between the tape and the heads and to further insure consistent positioning of the head relative to recorded tracks on the tapes.

In the past, many attempts have been made to provide mounting brackets for transducer heads used in conjunction with magnetic tapes, which allow the transducer head to be adjusted relative to the tape. Such devices, however, failed to provide suitable transducer head mounting arrangements either in that they lacked the accuracy desirable in a tape-to-transducer head relationship or required a plurality of adjustments through adjusting screws, thereby requiring a lengthy period for making the needed adjustments. For example, where three or more adjusting screws, or their equivalent, are used in the prior art devices, adjustment of any one screw produces a skewing action which requires adjustment of one or more other screws. Consequently, the prior art devices do not lend themselves to rapid, efficient assembly line techniques, thereby substantially increasing the manufacturing costs associated therewith. Head mounting techniques of this sort are disclosed in U.S. Pat. Nos. 2,560,569; 2,587,097; 2,678,971; 2,742,536; 2,897,288; 2,997,547; 3,137,772; 3,190,970; 3,229,044; and 3,502,820.

Another alternative to insure accurate mounting of the transducer heads is the use of precision instrumentation wherein the heads and their respective mounting units are machined to provide the proper mounting position. In the precision instrumentation technique the head is typically affixed on a precision holding fixture which positions the gaps and tracks in the proper position. The fixture and the head are then placed in a grinder or milling machine, etc., and the resulting surface is machined for proper fit to the face of the unit employing the magnetic head. Such a system obviously is very time consuming and costly to provide.

SUMMARY OF THE INVENTION

Accordingly, it is the primary object of the present invention to provide an adjustable mounting arrangement for a transducer head and the like which greatly simplifies transducer head adjustment over the prior art devices, and more rapid adjustment during assembly resulting in reduced manufacturing costs.

The present invention provides an adjustable mounting arrangement for a transducer head and the like which maintains the face of the tranducer head in a plane parallel to the plane of the tape travel and which also provides ready accurate adjustment of the azimuth alignment of the tape contacting face of the transducer head. Additionally, the present invention provides a transducer head adjustable mounting arrangement as described which includes means for adjusting the transducer head upward or downward relative to the longitudinal axis of the magnetic tape and includes novel means for adjusting the azimuth alignment of the tape contacting face without substantially affecting the upward or downward position of the head.

In the present arrangement, a plastic head bracket is provided which may be affixed or fastened to a tape deck in any well known manner. Included in the bracket are tape guides and an opening slightly larger than the magnetic head to be employed, and in a plane perpendicular to that opening, a pair of spring clip receiving openings. Alternately, the bracket could be designed as an integral portion of the tape deck, not a separate element. Also included is a metal azimuth bracket consisting of a flat plate having an opening in its center and downward turned lips or guides which are slightly inclined towards the center of the opening, which extend from each of the edges of the opening. This opening is adapted on a friction-fit basis to receive the magnetic head. Also included may be a pair of circular openings which may be useful for affixing the azimuth bracket to the head bracket.

During assembly the azimuth bracket is placed over the head bracket in a manner so that the opening in the azimuth bracket lies over that in the head bracket. A pair of spring clips then fit into the openings in the head bracket and which ride over the azimuth bracket, to retain the azimuth bracket in contact with the head bracket. The magnetic head is then placed within the opening in the azimuth bracket.

Because of the downward turning lips or projections, a friction fit is possible and the proper depth of penetration (vertical adjustment) can be made between the pole pieces of the magnetic head and the top of the azimuth bracket, thus insuring proper contact with the tape which is typically employed as the recording medium. Once proper placement is achieved, either by mechanical or electronic means, as far as vertical orientation is concerned, the head may be cemented in that proper location to the azimuth bracket.

At this time, the azimuth bracket may be adjusted manually to provide for proper orientation of the magnetic head in the lateral direction relative to the path of the recorded tape. Because of the spring clips that retain it, the azimuth bracket and head assembly are movable under pressure relative to the position of the head bracket. The adjustment is relatively simple being performed best under high power magnification, with various mechanical techniques employable to secure the proper orientation. After proper orientation has been made, again the azimuth bracket may be cemented to the head bracket insuring the proper relationship between the tape and the head inasmuch as the head bracket also serves as a tape guide insuring a proper path for the tape.

A further understanding of the present invention, together with the organization and manner of operation thereof, may best be understood by reference to the following description of a preferred embodiment of the invention taken in conjunction with the accompanied drawing in the several figures of which the referenced numerals identify like elements.

DESCRIPTION OF THE PREFERRED EMBODIMENT

Figure 1:
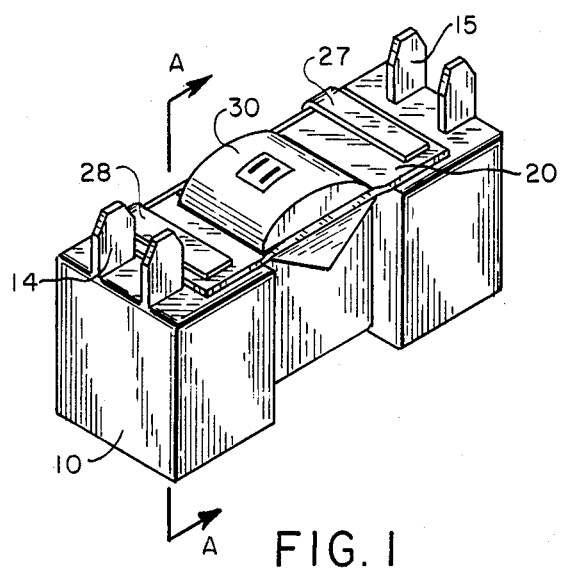
FIG. 1 is a perspective view of a preferred embodiment of a transducer head mounting arrangement in accordance with the present invention.
Figure 2:
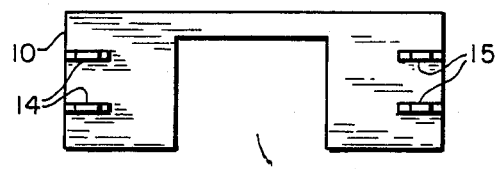
FIG. 2 is a top view of the head bracket as utilized in the present invention.
Figure 3:
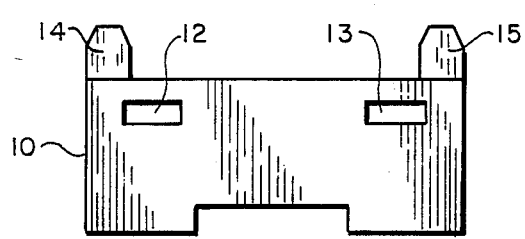
FIG. 3 is a rear view of a head bracket in accordance with the present invention.
Figure 5:
FIG. 5 is a side view of an azimuth bracket in accordance with the present invention.
Figure 6:
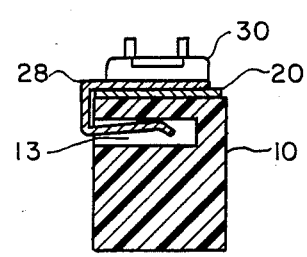
FIG. 6. is a sectional view of a transducer head mounting arrangement in accordance with the present invention taken across the lines A—A as shown in FIG. 1.

Referring now to the drawings, there is provided a head mounting bracket constructed in the preferred embodiment of plastic and designated as item 10. Contained within the bracket, and obvious as seen in FIG. 2, is an opening 11 of substantial size to receive head 30 and allow some lateral and vertical motion within said opening to provide for proper depth of penetration and lateral or azimuth adjustment. Also a part of the head mounting bracket 10 is the inclusion of two openings 12 and 13, as seen in FIG. 3, which are designed to accept spring retention clips 27 and 28 which retain the azimuth or head holding bracket 20 in contact with head mounting bracket 10. The design of spring clips 27 and 28 is such that adequate pressure is applied to retain the head mounting bracket in contact with the azimuth bracket unless a deliberate force is exerted to one or the other to provide the necessary azimuth or lateral adjustment. Head mounting bracket 10 also includes tape guides 14 and 15 mounted thereon to insure proper movement of recording tape past the recording head.

Figure 4:
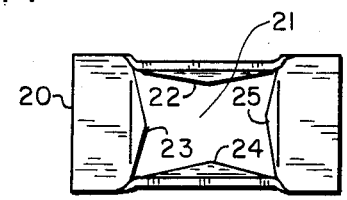
FIG. 4 is a top view of an azimuth bracket in accordance with the present invention.

The head holding or azimuth bracket 20 includes therein, as may be seen by reference to FIG. 4, an opening of approximately the same dimension as that of the magnetic transducer head 30. The edges 22, 23, 24 and 25 of opening 21 in the azimuth bracket 20 include downward turned lips which project inward, in slight angular relationship to the top of the azimuth bracket. These lips provide the necessary friction contact with head 30 when it is placed in position within the azimuth bracket.

Once transducer head 30 is placed within the opening 21 of azimuth bracket 20, vertical adjustment may take place on a manual basis, or by any other convenient means, so as to determine the proper positioning of the head in a vertical plane relative to the surface of the transducer head. After the proper vertical adjustment or penetration has been determined, a small amount of cement applied to the juncture points where the azimuth bracket 20 and the transducer head 30 are in contact will insure its remaining in that position.

The head 30 and azimuth bracket 20 are then placed on head bracket 10 with the head portion extending into the opening 11 and the azimuth bracket 20 being in contact with the upper surface of head bracket 10. At this time two spring clips 27 and 28 are slid into position with the lower portion engaging the openings 12 and 13, respectively; the upper portion in contact with the upper surface of the azimuth bracket 20, thus retaining the azimuth bracket 20 in relatively fixed contact with the head bracket 10.

At this time, azimuth adjustment insuring that the pole pieces of head 30 are properly oriented relative to the direction motion of a recording tape takes place. This adjustment is usually made mechanically but can be made by other means and once proper alignment is secured, the azimuth bracket 20 may be secured to head bracket 10 by means of application of small amounts of cement. Inasmuch as the head holding bracket 10 also is useful in directing the path of the tape, the tape and head are properly placed in relationship to each other for maximum effectiveness in recording or playback of information on the tape by means of the associated head 30.

While but a single embodiment of the invention has been shown, it will be obvious to those skilled in the art that numerous modifications can be made without departing from the spirit of the present invention which should be limited by the scope of the claims appended hereto.

What is claimed is:

1. Adjustable mounting means for supporting a transducer head, said mounting means comprising:
    a head bracket including head receiving means;
    an azimuth bracket adapted to adjustably support said trnasducer head, positioned on said head bracket so as to permit said transducer head to be positioned partially within the confines of said head receiving means; and
    flexible holding means retaining said azimuth bracket in contact with said head bracket;
    whereby said azimuth bracket may be adjusted relative to the direction of motion of recording tape moving past said transducer head.

2. Adjustable mounting means as claimed in claim 1, wherein: said head bracket further includes tape guide means.

3. Adjustable mounting means as claimed in claim 1, wherein: said head bracket includes at least one cavity adapted to receive a portion of said holding means.

4. Adjustable mounting means as claimed in claim 3, wherein: said holding means comprise at least one spring clip.

5. Adjustable mounting means as claimed in claim 4, wherein: said spring clip includes a first leg positioned within said cavity and a second leg positioned on said azimuth bracket so as to retain said azimuth bracket in contact with said head bracket.

6. Adjustable mounting means as claimed in claim 5, wherein: said azimuth bracket is affixed to said head bracket after said transducer head is positioned for contact with said flexible tape.

7. Adjustable mounting means as claimed in claim 1, wherein: said azimuth bracket includes a head receiving opening.

8. Adjustable mounting means as claimed in claim 7, wherein: said head receiving openings includes a plurality of lips inclined toward the center of said opening and adapted to frictionally retain said transducer head within said opening.

9. Adjustable mounting means as claimed in claim 8, wherein: said transducer head is permanently affixed to said azimuth bracket after positioning of said head relative to said flexible tape.

10. Adjustable mounting means as claimed in claim 1, wherein: said head bracket is constructed of plastic material.

11. Adjustable mounting means as claimed in claim 1, wherein: said azimuth bracket is constructed of non-ferrous metal.

* * * * *